Dec. 8, 1959 D. A. GILLEN 2,916,711

ELECTRICAL DELAY LINE

Filed June 11, 1956

INVENTOR.
DANIEL A. GILLEN

BY Lippincott & Smith

ATTORNEYS

United States Patent Office 2,916,711

Patented Dec. 8, 1959

2,916,711

ELECTRICAL DELAY LINE

Daniel A. Gillen, San Carlos, Calif., assignor to Admiral Corporation, Chicago, Ill., a corporation of Delaware Application June 11, 1956, Serial No. 590,465

5 Claims. (Cl. 333—31)

This invention relates to improvements in electrical delay lines for transmitting electric signals with a time delay, and relates in particular to an improved winding arrangement for delay lines of the distributed-constant type.

A distributed-constant electrical delay line consists essentially of a coil or coils having distributed series inductance and series capacitance, and a ground strip in close proximity to the coil for providing substantially distributed shunt capacitance. Electric signals are transmitted by such a line with an amount of time delay that is a direct function of the product of the inductance and the capacitance of the line. Consequently, in order to obtain a substantial time delay with as compact a delay line structure as possible, delay lines are usually designed for maximum practicable values of series inductance and shunt capacitance. However, other considerations such as the frequency bandpass, attentuation characteristics, and phase distortion must be considered during the design of a delay line.

Since the general principles of delay line design are known to those skilled in the art, they will not be discussed in detail herein. However, it should be noted that a high series capacitance is generally desirable for extending the frequency bandpass of the delay line and for providing a substantially uniform time delay throughout the pass band. For this reason, electrically "floating" conductive strips or "patches" have heretofore been extensively used in delay lines to increase the series capacitance. However, the use of "patches" increases the cost of the delay line and has other disadvantages. Accordingly, a principal object of this invention is to provide an improved inductive winding arrangement for electrical delay lines, having exceptionally high values of series inductance and capacitance so that a substantial time delay can be obtained with an exceptionally compact delay line structure, and so that a wide pass band and a substantially uniform time delay over the pass band can be obtained without the use of "patches." Other objects and advantages of the invention will appear as the description proceeds.

Briefly stated, in accordance with certain aspects of this invention, an improved electrical delay line includes an elongated cylindrical coil form with one or more conductive ground strips extending lengthwise along its side in the customary manner. An electrical conductor is wound about the coil form and ground strip into an elongated cylindrical multi-layer coil. The coil is wound in a novel winding arrangement consisting of successive sequences of turns progressing alternately fron inner to outer and from outer to inner layers of the multi-layer coil. Each sequence of turns that progresses from inner to outer layers of the coil is wound with reverse pitch, and each sequence of turns that progresses from outer to inner layers of the coil is wound with forward pitch, so that successive ones of the sequences of turns partially overly a plurality of the preceding sequences. With this winding arrangement, turns that are relatively remote along the length of the conductor are close together physically in the coil and are closely coupled by mutual inductances and series capacitances; and high values of series inductance and series capacitance are obtained whereby substantial time delays are provided in an exceptionally compact delay line structure, with a wide pass band and a substantially uniform time delay throughout the pass band, without the use of "patches."

It is desirable that the first sequence of turns be supported in the same spatial relation to the ground strips as the succeeding sequences of turns to prevent excessive shunt capacity at one end of the delay line. Preferably this is accomplished by providing a slanting shoulder near one end of the coil form, with the first sequence of winding turns overlying the slanting shoulder. The slanting shoulder can conveniently be made by winding a tapered non-conductive tape about one end of the coil form.

The invention will be better understood from the following detailed description taken in connection with the accompanying drawing, and its scope will be pointed out in the appended claims. In the drawing:

Figure 1:
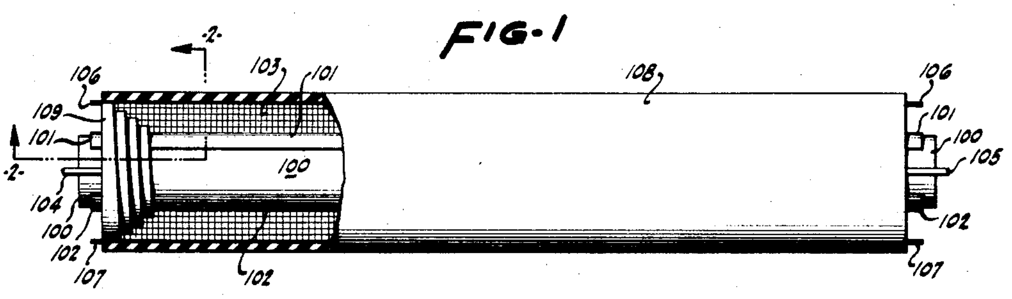
Fig. 1 is a side elevation, partly in section, of an electrical delay line embodying principles of this invention.

Referring now to the drawing, an elongated cylindrical coil form 100 is made of any low-loss non-conductive material, such as polystyrene. Conductive ground strips 101 and 102 preferably are strips of metal foil each extending lengthwise along substantially the entire length of a side of coilform 100. The grounding strips are generally connected to ground or its circuit equivalent. Winding 103 is a continuous length of insulated conductive wire, such as copper wire coated with a thin layer of any suitable insulating material, tightly wound into an elongated cylindrical multi-layer coil. Ends 104 and 105 of the winding are brought out from respective ends of the delay line to provide input and output electrical terminals. The coil is wound about coil form 100 and ground strips 101 and 102 so that the coil is in close proximity to the ground strips, which provide substantially distributed shunt capacitance for the delay line. Other ground strips 106 and 107, which are also strips of metal foil, may, if desired, be disposed lengthwise along the outside of the cylindrical coil to provide additional shunt capacitance. A protective sheath 108, of low-loss non-conductive material, may, if desired, surround the delay line.

Figure 2:
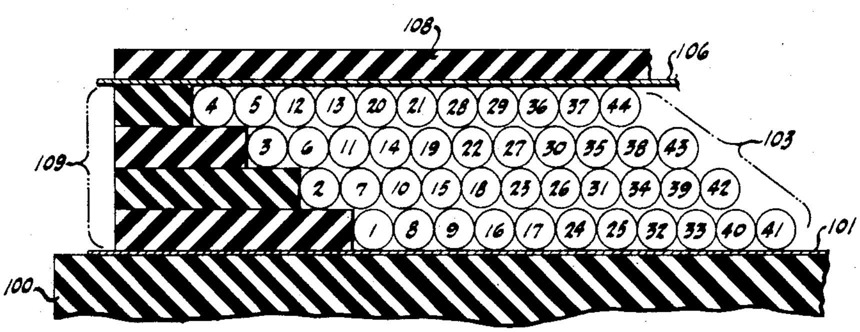
Fig. 2 is a somewhat schematic enlarged fragmentary section, taken along the line 2—2 of Fig. 1, showing the arrangement of successive turns of the winding.

The winding arrangement is best shown in Fig. 2, wherein successive turns of the coil are identified by successive reference numerals 1 through 44, inclusive. A first sequence of successive turns, reference numerals 1 through 4, is wound with a reverse pitch and progresses from the innermost layer to the outermost layer of the coil. The next sequence of turns, reference numerals 5 through 8, is wound with a forward pitch and progresses from the outermost layer to the innermost layer of the coil. Succeeding sequences of turns progress alternately from inner to outer and from outer to inner layers of the coil. Those sequences that progress from inner to outer layers are wound with a reverse pitch, and those sequences that progress from outer to inner layers are wound with a forward pitch, as is clearly shown in Fig. 2, so that each succeeding sequence of turns partially overlies a plurality of the preceding sequences. Preferably, all of the sequences contain substantially equal numbers of turns; and in all cases each sequence contains a plurality of turns.

In the winding arrangement, it will be noted that turns which are relatively far apart along the length of the wire are in close proximity in the coil. For example, turns 7 and 10 are immediately adjacent to turn 1, and turn 20 almost directly overlies turn 1. As a result, the coil has exceptionally high values of distributed series inductance and distributed series capacitance, and substantial delay times can be achieved with an exceptionally compact delay line structure. Furthermore, the pass band of frequencies transmitted by the delay line is exceptionally wide, and substantially uniform delay times are provided throughout the pass band without the use of "patches."

In the embodiment illustrated in Fig. 2, there are four layers in the multilayer winding, and there is one turn of each sequence of turns in each layer. However, any desired number of layers may be provided in the multilayer winding, and, if desired, there may be more than one turn of each sequence in each layer. For example, a sequence of turns might consist of two adjacent turns in the innermost layer, two adjacent turns in the next layer, two adjacent turns in the third layer, and two adjacent turns in the outermost layer. Delay line windings embodying principles of this invention have been constructed with as many as thirty turns in each sequence.

It has been noted that each sequence of turns partially overlies preceding sequences. In the case of the first sequence, reference numerals 1 through 4, there are no preceding sequences; but nevertheless, it is desirable that the first sequence have the same spatial relation as succeeding sequences with respect to the ground strips 101 and 102. Otherwise, there would be excessive shunt capacitance at one end of the delay line, which would adversely affect the delay line characteristics and in particular would diminish the useful width of the pass band within which signals can be transmitted with low phase distortion and uniform time delay. Consequently, a slanting shoulder preferably is provided near one end of the coil form, and the first sequence of turns overlies this slanting shoulder so that it has the same spatial relation to the ground strips as the succeeding sequences of turns.

Figure 3:
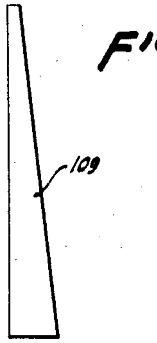
Fig. 3 is a developed view of the tapered tape that provides a slanting shoulder for supporting the first sequence of winding turns.

The slanting shoulder preferably is formed by winding a tapered non-conductive tape 109 (shown in Fig. 3) about one end of the coil form to provide a stepwise slanting shoulder for supporting the first sequence of turns of the winding. When the thickness of the tape is of the same order of magnitude as the diameter of the wire, tape 109 may be wrapped around coil form 100 substantially as many times as there are layers in the multilayer coil, so that a step of the shoulder is provided for each layer, as is shown in Fig. 2.

Figure 4:
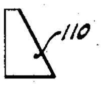
Fig. 4 is a developed view showing an alternative form of the tapered tape.

When the coil is wound of very fine wire, it may be more convenient to use a tape that is much thicker than the diameter of the wire. In this case, a shorter length of tapered tape 110 (shown in Fig. 4) may be employed. Tape 110 will extend around the coil form only once, or may even be shorter than a complete turn around the coil form. In this case the turns of the first sequence will be somewhat unevenly spaced from the ground strips, certain portions of each turn being quite close to the ground strips and other portions being quite remote from the ground strips, but the taper of the tape can be so adjusted that the effective shunt capacitance between each turn and the ground strips is substantially the same as in the embodiment illustrated in Fig. 2 using the longer tapered tape 109.

Delay lines constructed in accordance with the present invention are particularly useful in encoding devices of the type disclosed in the copending patent applications of Howard Bleam, entitled "Electric Pulse Encoding Device" Serial No. 590,464, filed June 11, 1956, and of Robert M. Jones, entitled "Temperature-Compensated Electric Pulse Encoding Device," Serial No. 590,466, filed June 11,1956, now U.S. Patent No. 2,854,658, granted September 30, 1958, both assigned to the same assignee as the present application.

It should be understood that this invention in its broader aspects is not limited to the specific embodiment herein illustrated and described, and that the following claims are intended to cover all changes and modifications that do not depart from the true spirit and scope of the invention.

What is claimed is:

1. An electrical delay line comprising an input terminal, an output terminal, and a common terminal, a conductor having its ends connected to said input and output terminals and wound into an elongated cylindrical multi-layer coil, in which successive turns progress alternately from inner to outer and from outer to inner layers thereof, each sequence of turns that progresses from inner to outer layers of the coil being wound with reverse pitch and each sequence of turns that progresses from outer to inner layers of the coil being wound with forward pitch so that successive ones of said sequences partly overlie a plurality of preceding sequences, and a ground strip connected to said common terminal and extending lengthwise of and in proximity to said coil.

2. An electrical delay line, comprising an input terminal, an output terminal, and a ground terminal, an elongated cylindrical coil form, a first conductive ground strip connected to the ground terminal and extending lengthwise along a side of said form, and an insulated electrical conductor having its ends connected to the input and output terminals and wound about said form and strip into an elongated cylindrical multi-layer coil in which successive turns progress alternately from inner to outer and from outer to inner layers thereof, each sequence of turns that progresses from inner to outer layers of the coil being wound with reverse pitch and each sequence of turns that progresses from outer to inner layers of the coil being wound with forward pitch so that successive ones of said sequences partially overlie a plurality of the preceding sequences, and a second ground strip extending lengthwise of and in proximity to said coil and also connected to said ground terminal.

3. An electrical delay line comprising an input terminal, an output terminal, and a ground terminal an elongated cylindrical non-conductive coil form, a plurality of metal foil conductive ground strips each connected to the ground terminal and each extending along a side of substantially the entire length of said form, and a continuous length of insulated conductive wire, said conductive wire having its ends connected to said input and output terminals and being tightly wound about said form and strips into an elongated cylindrical multi-layer coil, said coil being wound in successive sequences of turns progressing alternately from the innermost to the outermost and from the outermost to the innermost layers of said coil, said sequences containing substantially equal numbers of turns, each sequence of turns that progresses from the innermost layer to the outermost layer of said coil being wound with reverse pitch and each sequence of turns that progresses from the outermost layer to the innermost layer of said coil being wound with forward pitch.

4. An electrical delay line comprising an input terminal, an output terminal, and a ground terminal an elongated cylindricl coil form, a conductive foil strip extending along the length of said coil form and connected to said ground terminal, means forming a slanting shoulder near one end of said form, and an insulated electrical conductor having its ends connected to said input and output terminals and wound about said form and over said strip into an elongated cylindrical multi-layer coil, said coil being wound in successive sequences of turns, alternate ones of said sequences containing a plurality of successive turns wound with reverse pitch and progressing from inner to outer layers of said coil, other alternate ones of said sequences being wound with forward pitch and progressing from outer to inner layers of said coil, a first of said sequences overlying said slanting shoulder and succeeding ones of said sequences partially overlying preceding sequences.

5. An electrical delay line comprising an input terminal, an output terminal, and a ground terminal an elongated cylindrical non-conductive coil form, a metal foil conductive ground strip extending lengthwise along a side of said form, a tapered non-conductive tape wound about one end of said form to provide a stepwise slanting shoulder, and an insulated conductive wire having its ends connected to said input and output terminals and wound about said form and strip into an elongated cylindrical multi-layer coil, said coil being wound in successive sequences of turns, alternate ones of said sequences containing a plurality of successive turns wound with reverse pitch and progressing from inner to outer layers of said coil, other alternate ones of said sequences containing a plurality of successive turns wound with forward pitch and progressing from outer to inner layers of said coil, a first of said sequences overlying said slanting shoulder and succeeding ones of said sequences partially overlying preceding sequences.

References Cited in the file of this patent

UNITED STATES PATENTS

| | | |
|---|---|---|
| 2,515,683 | Acosta | July 18, 1950 |
| 2,522,731 | Wheeler | Sept. 19, 1950 |

FOREIGN PATENTS

| | | |
|---|---|---|
| 822,289 | France | Sept. 13, 1937 |
| 254,093 | Switzerland | Dec. 1, 1948 |